(12) United States Patent
Morita et al.

(10) Patent No.: US 12,443,143 B2
(45) Date of Patent: Oct. 14, 2025

(54) TRAIN WHEEL HOLDING STRUCTURE AND TIMEPIECE

(71) Applicant: CITIZEN WATCH CO., LTD., Tokyo (JP)

(72) Inventors: Shoichiro Morita, Saitama (JP); Daisuke Yamada, Tokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 437 days.

(21) Appl. No.: 18/021,321

(22) PCT Filed: Jul. 13, 2021

(86) PCT No.: PCT/JP2021/026284
§ 371 (c)(1),
(2) Date: Feb. 14, 2023

(87) PCT Pub. No.: WO2022/044584
PCT Pub. Date: Mar. 3, 2022

(65) Prior Publication Data
US 2023/0297029 A1    Sep. 21, 2023

(30) Foreign Application Priority Data

Aug. 31, 2020   (JP) ................................ 2020-146253

(51) Int. Cl.
*G04B 19/02*   (2006.01)
*G04B 13/02*   (2006.01)
*G04B 19/04*   (2006.01)

(52) U.S. Cl.
CPC ............. *G04B 19/02* (2013.01); *G04B 13/02* (2013.01); *G04B 19/044* (2013.01)

(58) Field of Classification Search
None
See application file for complete search history.

(56) References Cited

U.S. PATENT DOCUMENTS 7,443,768 B2 * 10/2008 Watanabe .............. G04C 3/008
  368/80
2011/0005055 A1    1/2011 Gigandet et al.
(Continued)

FOREIGN PATENT DOCUMENTS

CN      1790194 A *  6/2006  .......... G04B 19/241
CN    110083044 A     8/2019
(Continued)

OTHER PUBLICATIONS

International Search Report from corresponding International Application No. PCT/JP2021/026284, mailed on Oct. 5, 2021, 4 pages with translation.
(Continued)

*Primary Examiner* — Regis J Betsch
*Assistant Examiner* — Michael James Walker
(74) *Attorney, Agent, or Firm* — Tucker Ellis LLP

(57) ABSTRACT

A train wheel holding structure includes a main plate, a train wheel bridge, a pointer hand wheel or a pointe wheel supported by the main plate and the train wheel bridge, and a rotation hand movement train wheel or a fan-shaped/sector hand movement train wheel driving the pointer hand wheel, the train wheel bridge includes support holes corresponding to different two positions to support the pointer hand wheel, and between the two support holes of the train wheel bridge, a bush supporting the pointer hand wheel or the pointer hand wheel without looseness is provided in the support hole or the support hole by which the pointer hand wheel or the pointer hand wheel is supported and the bush is not provided in the support hole or the support hole by which the pointer hand wheel or the pointer hand wheel is not supported.

9 Claims, 7 Drawing Sheets

(56) References Cited

U.S. PATENT DOCUMENTS

2012/0230156 A1    9/2012   Goeller
2019/0094806 A1*   3/2019   Kunimi ................. G04B 19/02

FOREIGN PATENT DOCUMENTS

| JP | S52151053 | A |   | 12/1977 |   |   |
|----|-----------|---|---|---------|---|---|
| JP | S57132267 | U |   | 8/1982  |   |   |
| JP | H7159550  | A |   | 6/1995  |   |   |
| JP | 2518698   | Y |   | 11/1996 |   |   |
| JP | H0980168  | A |   | 3/1997  |   |   |
| JP | H1048349  | A |   | 2/1998  |   |   |
| JP | 2000147147| A |   | 5/2000  |   |   |
| JP | 2001108762| A |   | 4/2001  |   |   |
| JP | 2001324579| A | * | 11/2001 |   |   |
| JP | 2008116435| A |   | 5/2008  |   |   |
| JP | 2008267979| A |   | 11/2008 |   |   |
| JP | 4496552   | B2| * | 7/2010  | ............. | G04B 29/02 |

OTHER PUBLICATIONS

Office Action from corresponding Chinese Application No. 202180051561.2 mailed on Apr. 1, 2024, 10 pages with translation.

* cited by examiner

TRAIN WHEEL HOLDING STRUCTURE AND TIMEPIECE

CROSS-REFERENCE TO RELATED APPLICATION

The present application is based on and claims priority to Japanese Patent Application No. 2020-146253, filed on Aug. 31, 2020, the disclosure of which is hereby incorporated by reference in its entirety.

TECHNICAL FIELD

This disclosure relates to a train wheel holding structure and a timepiece.

BACKGROUND ART

A timepiece includes a function hand for displaying various functions in addition to a pointer hand for displaying a time such as an hour hand and a minute hand. A regular pointer hand for displaying a time is fixed to a center of a timepiece dial; however, the function hand is often fixed to a shaft that is deviated from the center of the timepiece dial and is provided offset to any of hour marks. The function hand may be referred to as a small hand.

For example, the small hand may be a small hand that moves by rotating similar to a pointer hand for displaying a time and also may be a small hand that moves in a fan shape/sector. The small hand moving by rotating can be a function hand such as a chronograph and the small hand moving in a fan shape/sector can display a remaining capacity of a battery as a power source.

The small hand moving in a fan shape/sector has a shaft to which a pointer hand is fixed. The shaft of the small hand moving in a fan shape/sector is disposed closer to a rim of a timepiece dial than the shaft of the small hand moving by rotating. Accordingly, it is necessary to provide a separate hole supporting a shaft for the small hand moving in a fan shape/sector than the hole for supporting the small hand moving by rotating.

The small hand moving in a fan shape/sector and the small hand moving by rotating have a different train wheel mechanism for moving the respective hand due to a different operation of hand movement.

A technique is herein proposed (see, e.g., JP2008-116435A) that uses a support member having two shaft holes, one hole for a shaft to which a pointer hand moving in a fan shape/sector is fixed and the other hole for a shaft to which a pointer hand moving by rotating is fixed. The support member can be used for both the small hand moving in a fan shape/sector and for the small hand moving by rotating. One of the two of the shaft holes is selectively used according to the train wheel mechanism to be used between the train wheel mechanism for the small hand moving in a fan shape/sector and the train wheel mechanism for the small hand moving by rotating.

SUMMARY

According to the technique disclosed in JP2008-116435A, a timepiece having modes for respective hand movements can be manufactured. In this technique, any of the train wheel mechanisms is selected according to the modes for two different hand movements, and the train wheel mechanism is assembled to the support member without changing the commonly used supporting member. This technique can thus reduce the manufacturing costs lower than that of a train wheel mechanism using a support member dedicated to each mode for hand movement.

When the support member made of a material such as resin having a wear resistance lower than that of metal is used, the support member described in the above-described patent literature easily accelerates its wear and has a problem regarding durability.

The present disclosure has been made in view of the above circumstances, and an object of the present disclosure is to provide a train wheel structure and a timepiece with improved durability compared to current support members used today.

A first aspect of the present disclosure provides a train wheel holding structure including a first support member, a second support member, a pointer hand wheel having a pointer hand and a shaft, the pointer hand wheel being supported by the first support member and the second support member, and a train wheel driving the pointer hand wheel. The first support member includes two or more shaft holes corresponding to two or more different positions to support the shaft of the pointer hand wheel. The second support member includes support holes corresponding to each of the two or more shaft holes. A bush supporting the shaft of the pointer hand wheel without looseness is provided in the support hole corresponding to the shaft hole by which the pointer hand wheel is supported. A bush is not provided in the support hole corresponding to the shaft hole by which the pointer hand wheel is not supported.

A second aspect of the present disclosure provides a timepiece including the train wheel holding structure according to the present disclosure, and the pointer hand wheel and the train wheel corresponding to the support hole in which the bush is provided.

DESCRIPTION OF EMBODIMENTS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of a train wheel holding structure and a timepiece including the train wheel holding structure according to the present disclosure will be described with reference to the drawings.

Figure 1:
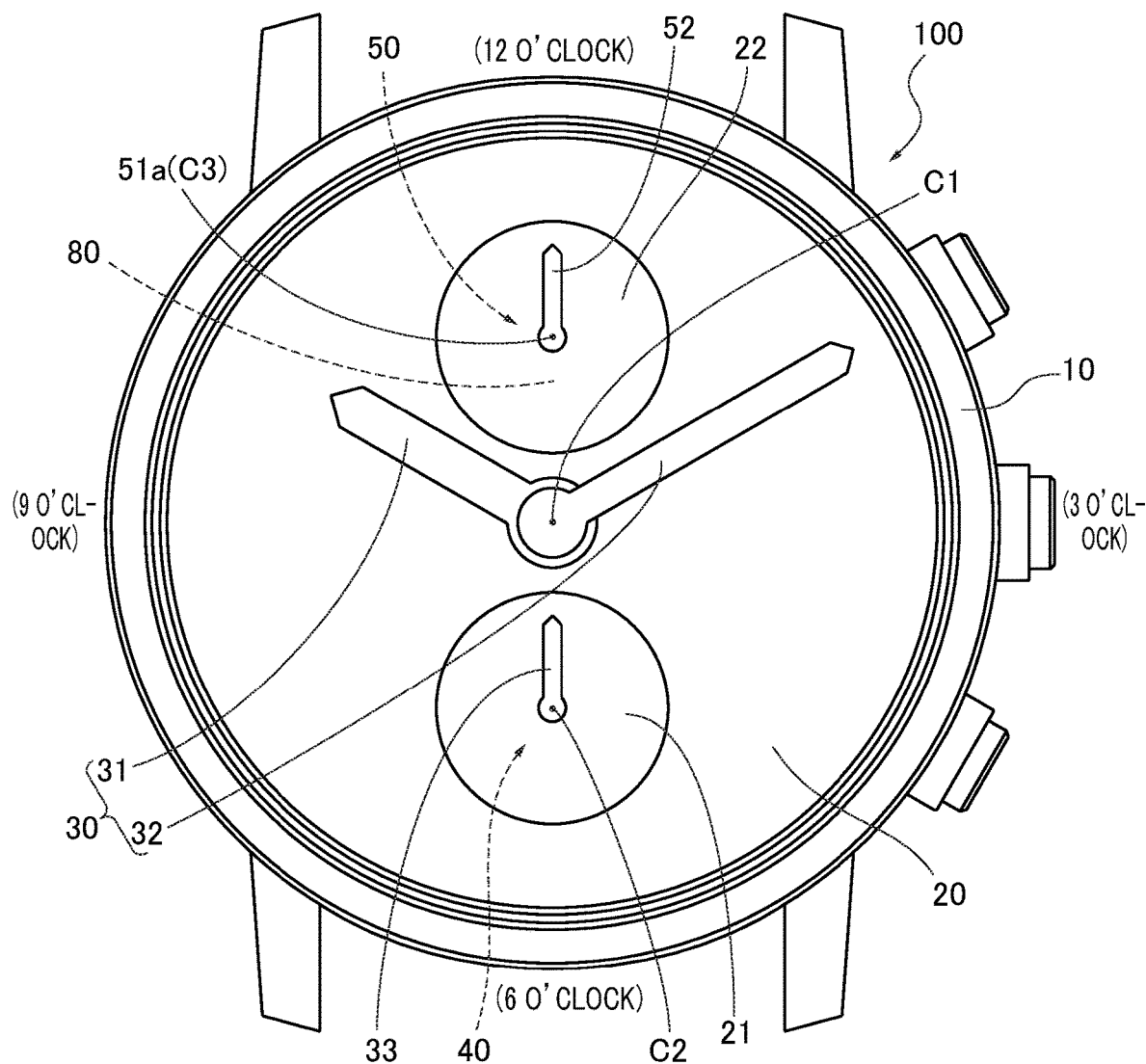
FIG. 1 is a plane view illustrating a timepiece including a train wheel holding structure according to one embodiment of the present disclosure, the train wheel holding structure holding a train wheel that moves a pointer hand by rotating (rotation hand movement train wheel).
Figure 2:
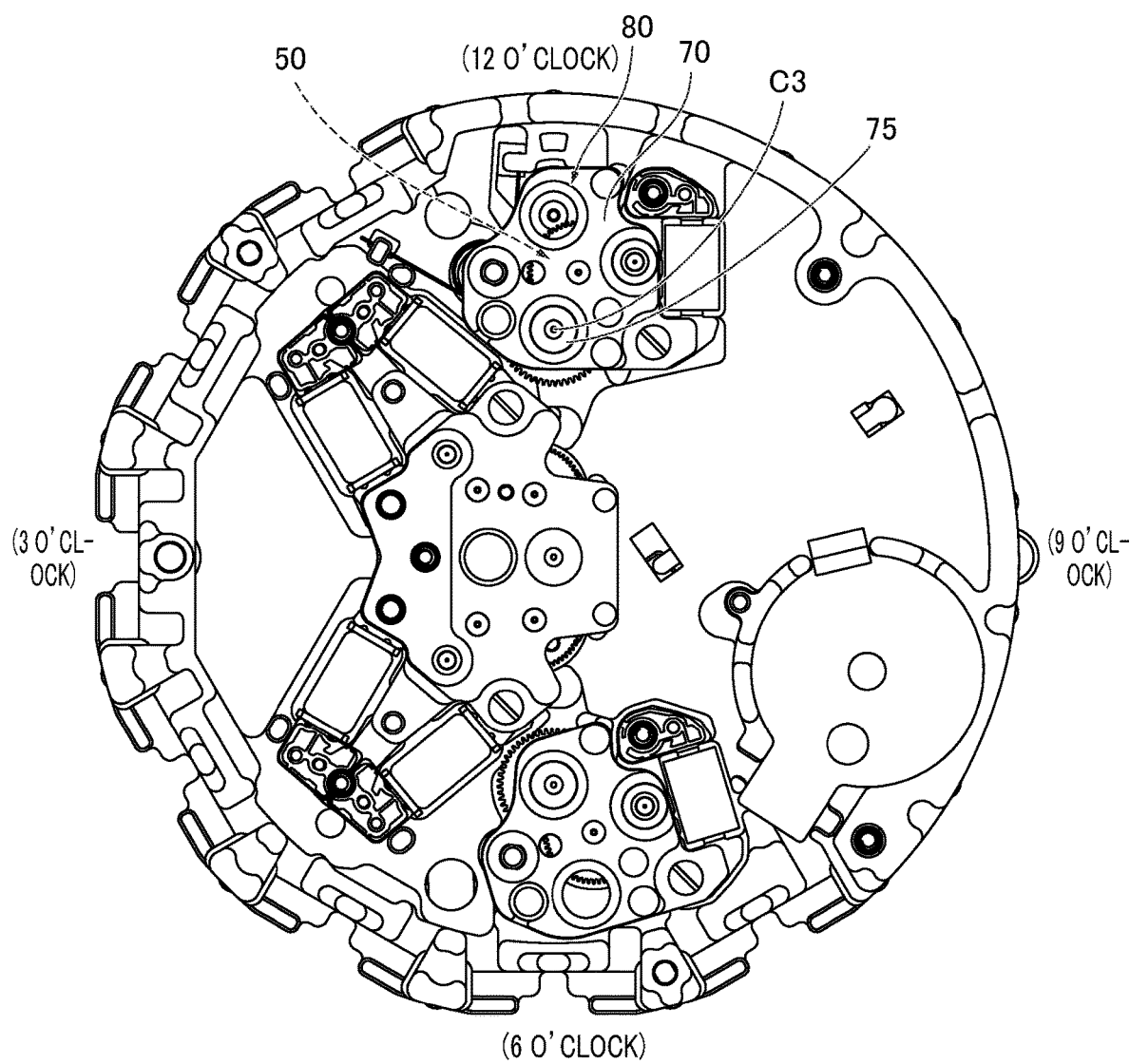
FIG. 2 is a view illustrating movements housed inside the timepiece illustrated in FIG. 1 as seen from a back cover side (opposite to timepiece dial) of the timepiece.

<Configuration> FIG. 1 is a plan view illustrating a timepiece 100 including a train wheel holding structure 80 (main plate 78 (FIG. 4), train wheel bridge 70, and bush 75) according to one embodiment of the present disclosure, the train wheel holding structure 80 holding a train wheel (rotation hand movement train wheel) 50 that moves a pointer hand by rotating. FIG. 2 is a view illustrating movements housed inside the timepiece 100 illustrated in FIG. 1 as seen from a back cover side (opposite to timepiece dial 20) of the timepiece 100.

Figure 3:
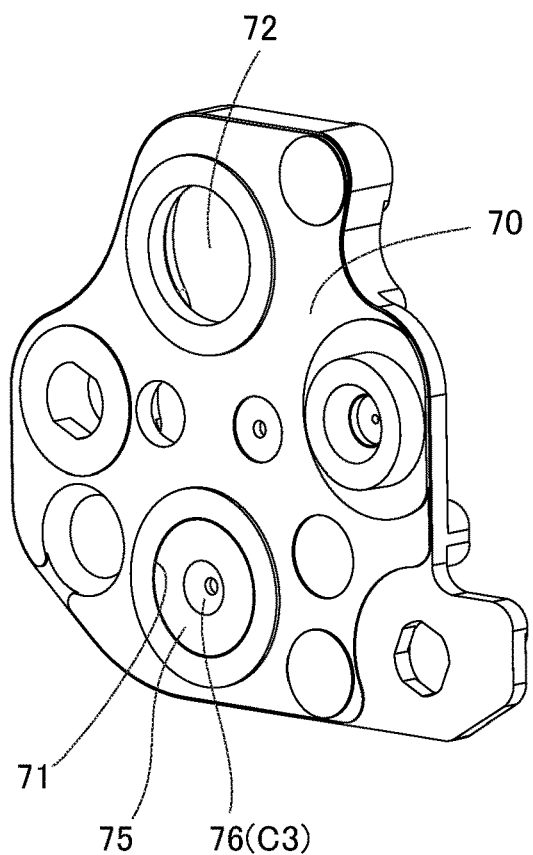
FIG. 3 is a schematic view illustrating a train wheel bridge of the train wheel holding structure holding a pointer hand wheel of the movements illustrated in FIG. 2.
Figure 4:
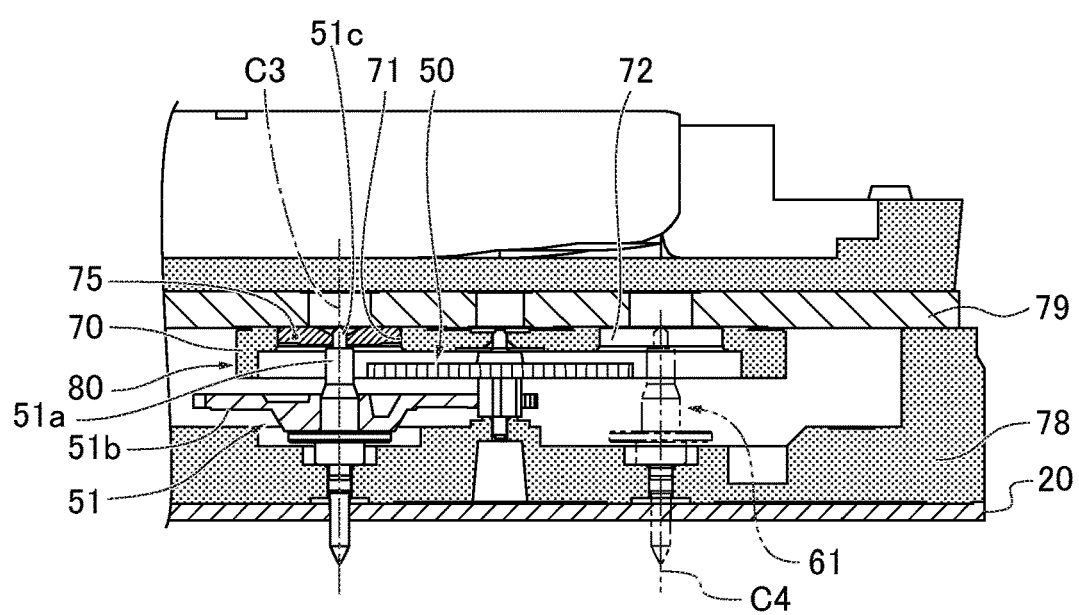
FIG. 4 is a sectional view of the train wheel holding structure holding the pointer hand wheel and the rotation hand movement train wheel.
Figure 5:
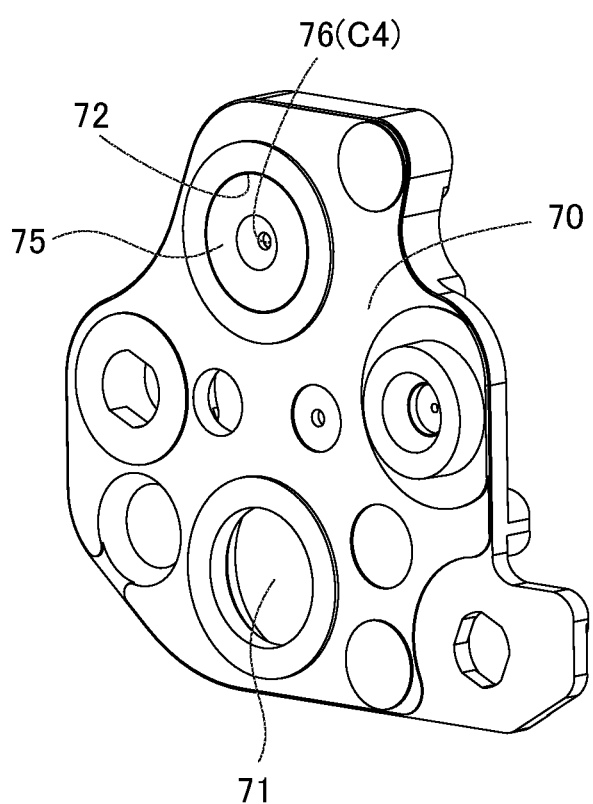
FIG. 5 is a schematic view corresponding to FIG. 3 and illustrating the train wheel bridge in which a bush is disposed in a support hole different from a support hole in which the bush illustrated in FIG. 3 is disposed.

FIG. 3 is a schematic view illustrating a train wheel bridge 70 of the train wheel holding structure 80 holding a pointer hand wheel 51 (FIG. 4) of the movements illustrated in FIG. 2. FIG. 4 is a sectional view of the train wheel holding structure 80 holding the pointer hand wheel 51 and the rotation hand movement train wheel 50. FIG. 5 is a schematic view corresponding to FIG. 3 and illustrating the train wheel bridge 70 in which a bush 75 is disposed in a support hole 72 different from a support hole 71 in which the bush 75 illustrated in FIG. 3 is disposed.

The timepiece 100 illustrated in FIG. 1 is one example of the timepiece according to the present disclosure. To display time, the timepiece 100 points to an hour mark displayed on the timepiece dial 20 with a pointer hand 30, like an hour hand 31 and a minute hand 32. The timepiece dial 20 is disposed inside a case 10, and has a circular shape. The hour mark includes a number and an index bar, for example. The pointer hand 30, like the hour hand 31 and the minute hand 32, rotates about a center C1 of the timepiece dial 20 on a front face of the timepiece dial 20 (face of timepiece 100 visually recognized by the user (face opposite to face facing rear cover)). Note that the hour mark is not illustrated in FIG. 1.

The timepiece 100 includes, in a region of the timepiece dial 20 in a six o'clock direction (lower region of timepiece dial 20 in FIG. 1), a circular first small hand region 21 and, in a front face of the small hand region 21, a function hand 33 rotating about a center C2 of the circular small hand region 21. The function hand 33 rotates by a function hand driving train wheel 40 disposed in the rear face of the timepiece dial 20.

The function hand 33 may be applied as a chronograph or other hands displaying various physical amounts such as a water depth, an altitude, and/or an air pressure. A second hand may be applied for the timepiece 100 instead of the function hand 33.

When the second hand is applied instead of the function hand 33, a second hand driving train wheel driving the second hand is applied instead of the function hand driving train wheel 40.

The timepiece 100 includes, in a region of the timepiece dial 20 in a 12 o'clock direction (upper region of timepiece dial 20 in FIG. 1), a circular second small hand region 22 and, in a front face of the small hand region 22, a pointer hand 52 moving by rotating about a center C3 of the circular small hand region 22.

The center C3 of the small hand region 22 of the timepiece dial 20 (corresponding to center of support hole 71) is positioned farther from the rim of the timepiece dial 20 than an later-described center C4 (corresponding to center of support hole 72). The distance from center C1 to center C3 of timepiece dial 20 is shorter than distance from center C1 to center C4 of timepiece dial 20. The support hole 71 corresponding to the position relatively far from the rim of the timepiece dial 20 of the support holes 71, 72 supports a pointer hand wheel 51 moving by rotating.

As illustrated in FIG. 4, the pointer hand wheel 51 is disposed in the rear face of the timepiece dial 20. The pointer hand wheel 51 includes a gear 51b and a shaft 51a that penetrates through the center C3 of the gear 51b and extends along the center C3. The shaft 51a fixes the gear 51b. A part of the shaft 51a penetrates through the main plate 78 (one example of first support member) and the timepiece dial 20 to be exposed on the front face of the timepiece dial 20. The pointer hand 52 is fixed to the shaft 51a exposed on the front face of the timepiece dial 20.

The main plate 78 is made of a resin material, for example. The shaft hole of the main plate 78 supporting the shaft 51a has a size slightly larger than the diameter of the shaft 51a, and supports one end of the shaft 51a with little looseness. The material of the main plate 78 is not limited to resin. The main plate 78 may be made of a metal material or a ceramic material, for example.

A train wheel bridge 70 (one example of second support member) is disposed on the rear face of the timepiece dial 20 substantially parallel to the main plate 78. In this embodiment, the main plate 78 is disposed between the pointer hand 52 and the train wheel bridge 70.

The train wheel bridge 70 is made of a resin material, for example. As illustrated in FIG. 3, the train wheel bridge 70 includes the two support holes 71, 72. The two support holes 71, 72 are provided in different positions. The two support holes 71, 72 have the same diameter and have a size several times larger than the diameter of a pivot 51c of the shaft 51a (portion supported by shaft hole 76 of later-described bush 75).

That is, the support holes 71, 72 loosely support the other end of the shaft 51a. With this configuration, even though one end of the shaft 51a is supported by the shaft hole without looseness, if the bush 75 is not disposed in the support hole 71, 72, the support holes 71, 72 cannot support the entire shaft 51a without looseness, and as a result, cannot normally rotate the pointer hand wheel 51 to normally operate the pointer hand 52. Note that the support hole 71 corresponds to the position of the center C3, and the support hole 72 corresponds to the position of the after-described center C4.

One support hole 71 of the two support holes 71, 72 is provided with the bush 75. The other support hole 72 of the two support holes 71, 72 is not provided with the bush 75. The bush 75 is made of a metal material, for example, having a wear resistance higher than that of the resin material for the train wheel bridge 70.

Note that the bush 75 may be made of a material other than a metal material. The bush 75 may be made of a material having a wear resistance higher than that of a resin material as a material other than a metal material. The bush 75 may be made of, for example, a ceramic or a semiprecious stone such as a ruby as a material having a wear resistance higher than that of a resin material other than a metal material.

The bush 75 includes a shaft hole 76 in the center C3 thereof having a size slightly larger than the diameter of the pivot 51c of the shaft 51a. The shaft hole 76 supports the other end of the shaft 51a with little looseness. As the both ends of the shaft 51a are supported by the shaft hole of the main plate 78 and the shaft hole 76 of the bush 75 without looseness, the shaft 51a can normally rotate the pointer hand wheel 51 to normally operate the pointer hand 52.

The gear 51b of the pointer hand wheel 51 engages with the rotation hand movement train wheel 50 supported by the train wheel holding structure 80 having the main plate 78 and the train wheel bridge 70, and the pointer hand wheel 51 rotates about the center C3 without looseness by the torque transmitted from the rotation hand movement train wheel 50.

Figure 6:
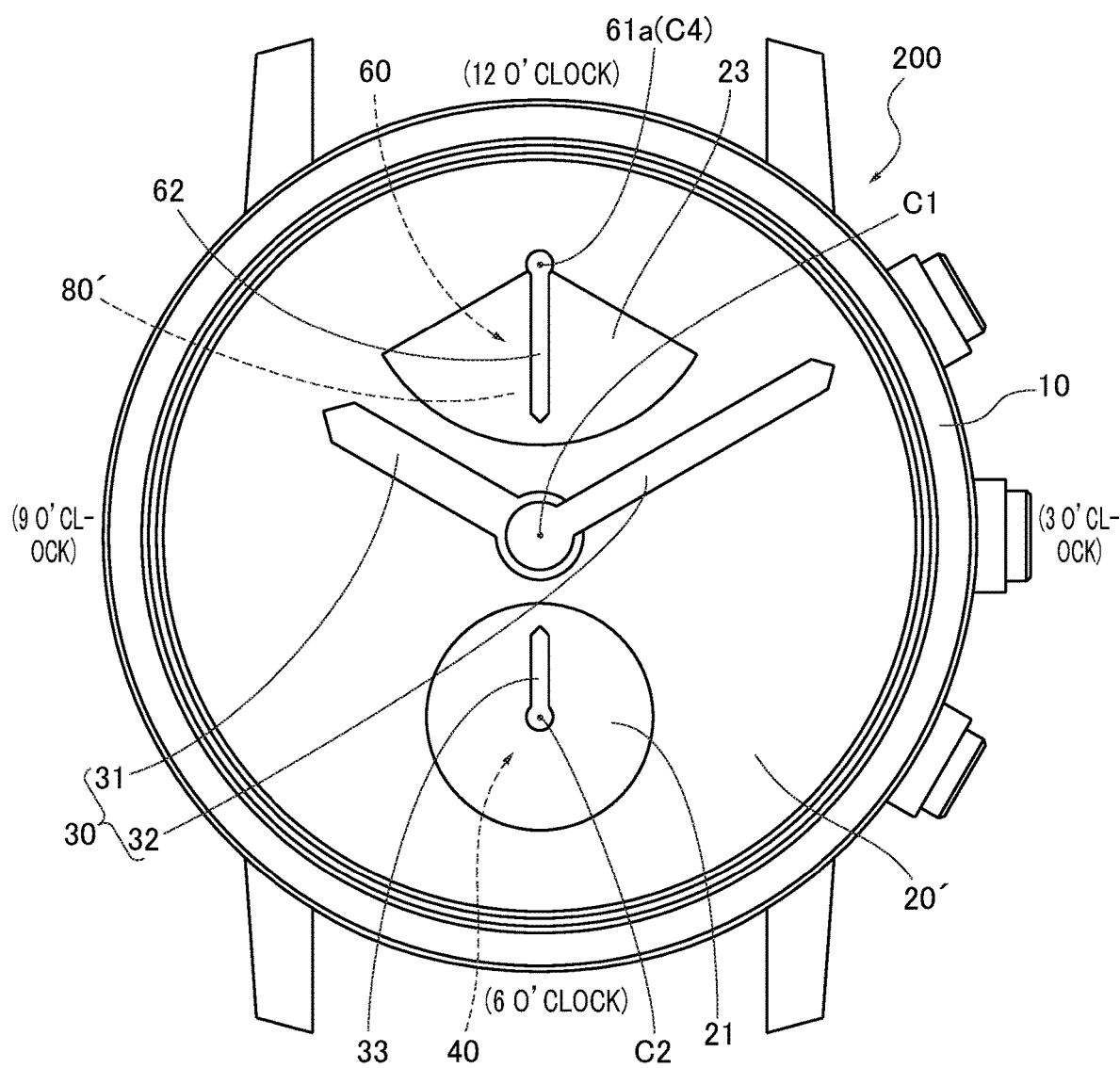
FIG. 6 is a plan view illustrating a timepiece including a train wheel holding structure according to one embodiment of the present disclosure, the train wheel holding structure holding a train wheel (fan-shaped/sector hand movement train wheel) that arcuately moves a pointer hand in a fan-shaped/sector range.
Figure 7:
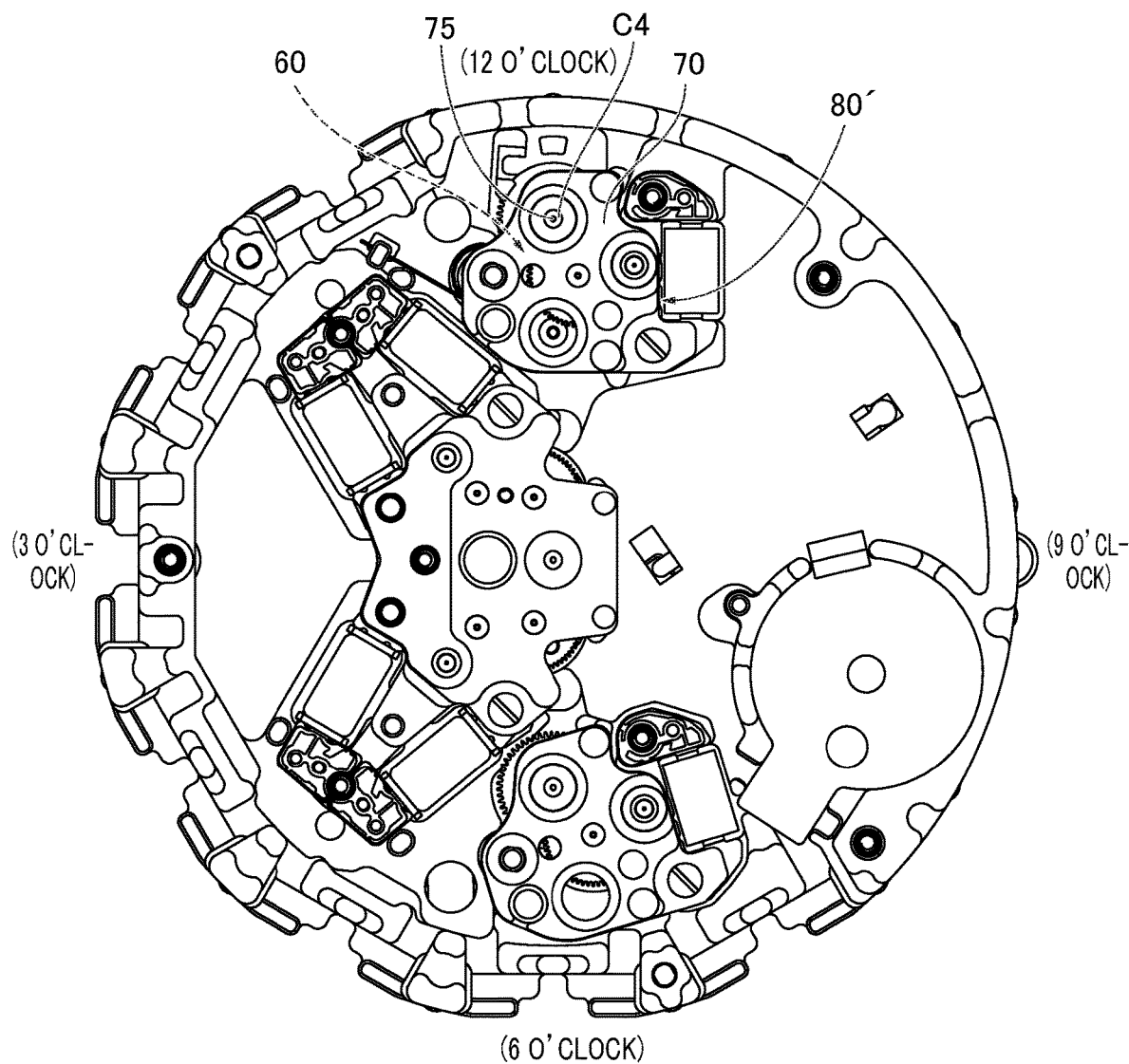
FIG. 7 is a view illustrating movements housed inside a timepiece illustrated in FIG. 6 as seen from a back cover side (opposite to timepiece dial) of the timepiece.

FIG. 6 is a plan view illustrating the timepiece 200 including a train wheel holding structure 80' (main plate 78, train wheel bridge 70, and bush 75) according to one embodiment of the present disclosure. The train wheel holding structure 80' holding a train wheel (fan-shaped/sector hand movement train wheel) 60 arcuately moving the pointer hand 52 in a fan-shaped/sector range. FIG. 7 is a view illustrating movements housed inside the timepiece 200 illustrated in FIG. 6 as seen from a back cover side (opposite to timepiece dial 20') of the timepiece 200.

Figure 8:
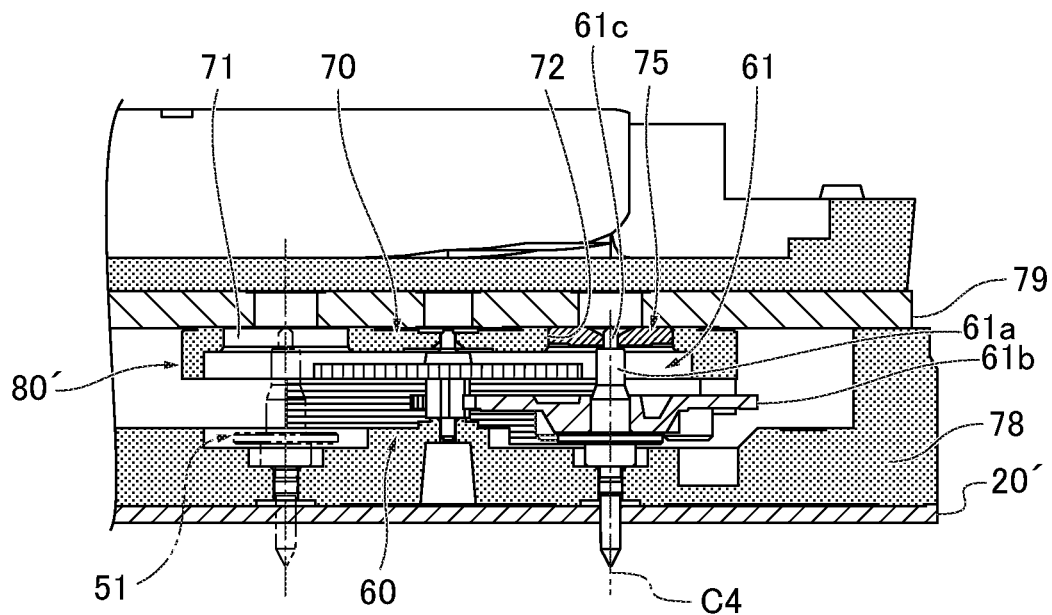
FIG. 8 is a sectional view of the train wheel holding structure holding the pointer hand wheel and the rotation hand movement train wheel.

FIG. 5 is a schematic view corresponding to FIG. 3 and illustrating the train wheel bridge 70 in which the bush 75 is disposed in the support hole 72 and the train wheel bridge 70 of the train wheel holding mechanism 80' holding the pointer hand wheel 61 of the movements illustrated in FIG. 7. FIG. 8 is a sectional view of the train wheel holding structure 80' holding the pointer hand wheel 61 and the fan-shaped/sector hand movement train wheel 60.

The train wheel holding structure 80 illustrated in FIG. 1 and the train wheel holding structure 80' illustrated in FIG. 6 have the same train wheel bridge 70 and the main plate 78, and have the same structure other than the support hole of the train wheel bridge 70 in which the bush 75 is provided.

The timepiece 200 illustrated in FIG. 6 is one example of the timepiece according to the present disclosure. To display the time, the timepiece 200 points to an hour mark displayed on a timepiece dial 20' with the hour hand 31 and the minute hand 32. The timepiece dial 20' is disposed inside the case 10, and has a circular shape. The hour mark includes a number and an index bar, for example. The pointer hand 30, like the hour hand 31 and the minute hand 32, rotates about the center C1 of the timepiece dial 20' on the front face of the timepiece dial 20'. Note that the hour mark is not illustrated in FIG. 6.

The timepiece 200 has, in a region of the timepiece dial 20'in the six o'clock direction, a circular first small hand region 21. The function hand 33 rotating about the center C2 of the circular small hand region 21 is disposed in the front face of the small hand region 21. The function hand 33 rotates by the function hand driving train wheel 40 disposed in the rear face of the timepiece dial 20'.

The timepiece 200 has, in a region of the timepiece dial 20' in the 12 o'clock direction (upper region of timepiece dial 20' in FIG. 6), a fan-shaped/sector second small hand region 23 having the arc shape oriented toward the center C1 and a center C4 positioned toward the 12 o'clock. A pointer hand 62 moves by swinging in the fan-shaped/sector range about the center C4 of the fan-shaped/sector second small hand region 23 and is disposed in the front face of the small hand region 23.

The center C4 in the small hand region 23 of the timepiece dial 20' (corresponding to center of support hole 72) is positioned closer to the rim of the timepiece dial 20, 20' than the center C3 of the timepiece dial 20 illustrated in FIG. 1. The distance from center C1 to center C4 in timepiece dial 20' is longer than distance from center C1 to center C3 in timepiece dial 20'. Accordingly, the support hole 72 of the support holes 71, 72 corresponding to the position relatively close to the rim of the timepiece dial supports the pointer hand wheel 61 moving in a fan shape/sector.

As illustrated in FIG. 8, the pointer hand wheel 61 is disposed on the rear face of the timepiece dial 20'. The pointer hand wheel 61 includes a gear 61b and a shaft 61a that penetrates through the center C4 of the gear 61b and extends along the center C4. The shaft 61a fixes the gear 61b. A part of the shaft 61a penetrates through the main plate 78 (one example of first support member) and the timepiece dial 20' to be exposed on the front face of the timepiece dial 20'. The pointer hand 62 is fixed to the shaft 61a on the front face of the timepiece dial 20'.

The shaft hole of the main plate 78 supporting the shaft 61a has a size slightly larger than the diameter of the shaft 61a, and supports one end of the shaft 61a with little looseness.

The train wheel bridge 70 (one example of second support member) is disposed on the rear face of the timepiece dial 20' substantially parallel to the main plate 78. In this embodiment, the main plate 78 is disposed between the pointer hand 62 and the train wheel bridge 70.

The train wheel bridge 70 is the same as the train wheel bridge 70 illustrated in FIG. 3, and includes the support hole 71 corresponding to the position of the center C3 and the support hole 72 corresponding to the position of the center C4. The support hole 72 is provided with the bush 75 as illustrated in FIG. 5. The support hole 71 of the train wheel bridge 70 illustrated in FIG. 5 is not provided with the bush 75.

The bush 75 is provided with the shaft hole 76 in the center C4 thereof having a size slightly larger than the diameter of the pivot 61c of the shaft 61a (portion supported by shaft hole 76). The shaft hole 76 supports the pivot 61c of the shaft 61a with little looseness.

As both ends of the shaft 61a are supported by the shaft hole of the main plate 78 and the shaft hole 76 of the bush 75 without looseness, the shaft 61a can normally rotate the pointer hand wheel 61 to normally function the pointer hand 62.

The gear 61b of the pointer hand wheel 61 engages with the fan-shaped/sector hand movement train wheel 60 supported by the train wheel holding mechanism 80' including the main plate 78 and the train wheel bridge 70. The pointer hand wheel 61 moves in the fan-shaped/sector range without looseness about the center C4 by the torque transmitted from the fan-shaped/sector hand movement train wheel 60.

Note that the train wheel holding structure 80 differs from the train wheel holding structure 80' only in that the support hole of the train wheel bridge 70 provided with the bush 75 is the support hole 71 or the support hole 72.

Figure 9:
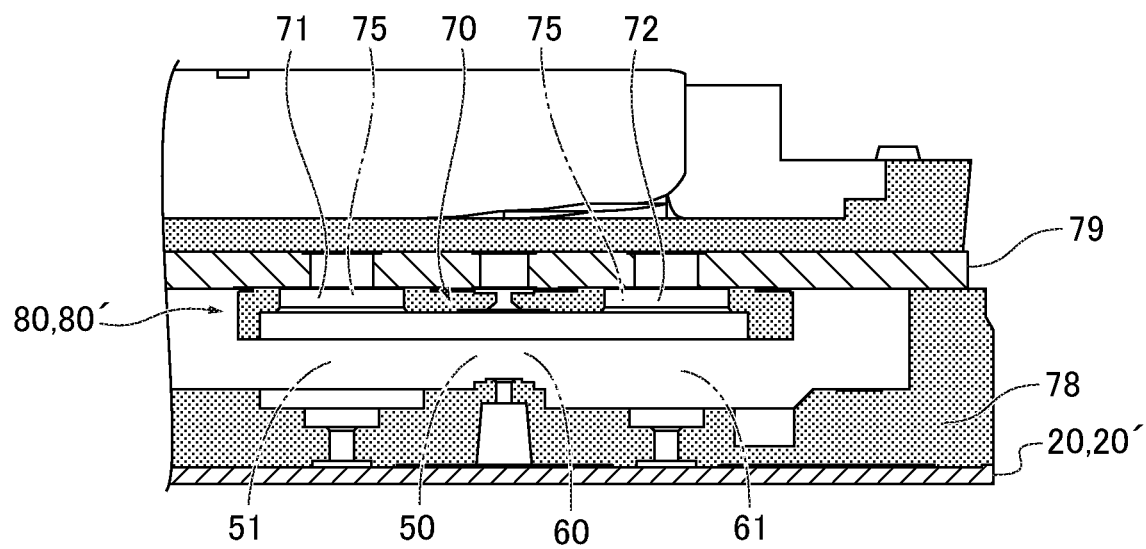
FIG. 9 is a sectional view corresponding to FIGS. 4, 8 and illustrating a basic structure (train wheel bridge and main plate) of the train wheel holding structure.

<Operation> FIG. 9 is the sectional view corresponding to FIGS. 4, 8 and illustrating the basic structure (train wheel bridge 70 and main plate 78) of the train wheel holding structures 80, 80'.

The timepiece 100 illustrated in FIG. 1 differs from the timepiece 200 illustrated in FIG. 6 in the timepiece dials 20, 20', namely, the center C3 corresponding to the support hole 71 and the center C4 corresponding to the support hole 72, which are provided in different positions. The second small hand region 22 has the center C3, and the second small hand region 23 has the center C4.

The movements provided inside the timepieces 100, 200 differ in the pointer hand wheel 51 having the shaft 51a in the center C3 and the rotation hand movement train wheel 50 driving the pointer hand wheel 51 (refer to FIG. 4), and the pointer hand wheel 61 having the shaft 61a in the center C4 and the fan-shaped/sector hand movement train wheel 60 driving the pointer hand wheel 61 (refer to FIG. 8).

On the other hand, the train wheel holding structure 80 supporting the pointer hand wheel 51 and the rotation hand movement train wheel 50 and the train wheel holding structure 80' supporting the pointer hand wheel 61 and the fan-shaped/sector hand movement train wheel 60 have the same basic structural elements of the main plate 78 and the train wheel bridge 70, and differ in the attachment portion (attachment position) of one bush 75 added to the train wheel bridge 70.

That is, the train wheel holding structures 80, 80' of the present embodiment include the same main plate 78 and the same train wheel bridge 70 and differ in whether the bush having a cost lower than that of the basic structural element is attached to the support hole 71 corresponding to the center C3 or is attached to the support hole 72 corresponding to the center C4.

Accordingly, when the timepiece 100 in which the small hand region 22 of the center C3 is provided is manufactured as a timepiece, the timepiece dial 20 having the small hand region 22 of the center C3 is selected as a timepiece dial, and the pointer hand wheel 51 and the rotation hand movement train wheel 50 corresponding to the small hand region 22 are selected as movements. The train wheel holding structure 80, the bush 75, the train wheel bridge 70, and the main plate 78 (see FIG. 9) are commonly used when manufacturing the timepiece 200 having the small hand region 22 of the center C4. In the timepiece 100, the bush 75 is only attached to the support hole 71.

On the other hand, when the timepiece 200 in which the small hand region 23 of the center C4 is provided is manufactured as a timepiece, the timepiece dial 20' having the small hand region 23 of the center C4 is selected as a timepiece dial, and the pointer hand wheel 61 and the fan-shaped/sector hand movement train wheel 60 corresponding to the small hand region 23 are selected as movements. The train wheel holding structure 80', the bush 75, the train wheel bridge 70, and the main plate 78 (refer to FIG. 9) are commonly used when manufacturing the timepiece 100 having the small hand region 22 of the center C3. In the timepiece 200, the bush 75 is only attached to the support hole 72.

As described above, when the different hand movement train wheels (50, 60) corresponding to the two types of the timepiece dials 20, 20' having the different centers (C3, C4) are selectively applied, the attachment position of the bush 75 is only changed, so that it becomes unnecessary to change the basic structure (train wheel bridge 70 and main plate 78) of the train wheel holding structures 80, 80'.

That is, the train wheel holding structures 80, 80' of the present embodiment have the basic structure (train wheel bridge 70 and main plate 78) commonly used relative to the different hand movement train wheels (50, 60), and a basic configuration dedicated for each of the different hand movement wheels (50, 60) is not required. The manufacturing costs can be thereby lowered.

In the present embodiment, the two types of the rotation hand movement train wheel 50 and the fan-shaped/sector hand movement train wheel 60 are applied as the intermediate wheels driving the pointer hand wheels 51, 61. However, the intermediate wheels are not limited to the combination of the rotation hand movement wheel and the fan-shaped/sector hand movement wheel. A combination of a rotation hand movement wheel and a rotation hand movement wheel, a combination of a fan-shaped/sector hand movement wheel and a fan-shaped/sector hand movement wheel, a combination of two or more types of intermediate wheels, or a single type of an intermediate wheel may be used.

That is, in the present disclosure, any intermediate wheel may be used as long as it engages with the pointer hand wheel supported to correspond to the two or more different positions, and drives the pointer hand wheel.

The intermediate wheel can engage with each of the pointer hand wheels corresponding to the two different positions to be supported by changing the position engaging with the pointer hand wheel even though a single type intermediate wheel is used.

In this case, the support position of the pointer hand wheel is selected from any of the support holes, and the bush is attached to the selected support hole while the intermediate wheel is commonly used for the two positions to which the pointer hand wheel is attached. The train wheel holding structure and the timepiece to which the pointer hand is attached to different positions can be thereby achieved, the manufacturing costs can be further lowered, and the assembling management costs can be also lowered.

According to the timepieces 100, 200 of the present embodiment, the train wheel holding structures 80, 80' having the commonly used basic structure can be applied even for the different hand movement wheels 50, 60. The manufacturing costs of the timepieces 100, 200 can be thereby lowered.

The train wheel holding structure can be commonly used relative to the two types of the hand movement wheel trains (50, 60) by a configuration in which the bush 75 is attached to both of the two support holes 71, 72 of the train wheel bridge 70 constituting the basic structure and a structure in which the portions corresponding to the two support holes 71, 72 of the train wheel bridge 70 are formed into the same shape as the bush 75.

However, in this case, the train wheel bridge 70 is required to directly support the pointer hand wheels (50, 60), and the train wheel bridge 70 requires the durability (in particular, wear resistance, hereinafter the same) for supporting the pointer hand wheels (50, 60). Accordingly, the train wheel bridge 70 is required to be made of a metal material, for example, to be suitable for the durability.

On the other hand, in the train wheel holding structures 80, 80' of the present embodiment, the train wheel bridge 70 does not require the durability for supporting the pointer hand wheels (50, 60) as long as the bush 75 that is attached to the train wheel bridge 70 has the durability.

Accordingly, the train wheel bridge 70 does not always require the durability of a metal material, and may be made of a resin material, for example. As the train wheel bridge 70 is made of the resin material, for example, such a train wheel bridge can be light-weighted and the costs of such a train wheel bridge can be lowered smaller than that made of a metal material.

Moreover, as the bush 75 is attached to only one of the two support holes 71, 72 according to the applied pointer hand wheels (51, 61) and hand movement wheels (50, 60), the weight of the train wheel bridge 70 can be further reduced and the costs of such a train wheel bridge can be lowered smaller than that of the train wheel bridge in which the bush 75 is attached to both of the support holes 71, 72.

In order to reliably prevent that the bush 75 is provided in both of the two support holes 71, 72, the train wheel bridge 70 may include a structure (a both attachment preventing structure) that prevents the bush 75 from being attached to the other support hole 72 (or support hole 71) when the bush 75 is attached to one support hole 71 (or support hole 72).

For example, the following structure may be applied as the both attachment preventing structure. A bar member bridged over the support hole 71 and the support hole 72 may be provided in the train wheel bridge 70, and one end portion of the bar member is slightly projected from the support hole 71. The bar member is movably supported between the support hole 71 and the support hole 72.

The bar member and the structure supporting the bar member as described above are one example of the both attachment preventing structure. With this both attachment preventing structure, when the bush 75 is attached to the support hole 71 in advance, the outer circumferential surface of the bush 75 presses the end portion of the bar member projecting from the support hole 71 to the contour of the inner circumferential surface of the support hole 71.

The bar member is thereby displaced in the direction of the other support hole 72. As a result, the other end of the bar member slightly projects from the other support hole 72, and the bush 75 cannot be attached to the support hole 72 due to the obstacle by the projected portion.

When the bush is attached to the other support hole 72, in contrast to the above, the end portion of the bar member slightly projects from the one support hole 71, and the bush 75 cannot be attached to the support hole 71 due to the obstacle by the projected portion.

As described above, the train wheel bridge 70 including the both attachment preventing structure reliably prevents both of the two support holes 71, 72 from being simultaneously provided with the bush 75. However, the pointer hand wheel holding structure of the present disclosure does not always require such a both attachment preventing structure.

According to the train wheel holding structures 80, 80' of the above embodiment, the main plate 78 is applied as the first support member and the train wheel bridge 70 is applied as the second support member. However, the train wheel holding structure according to the present disclosure is not limited to the above embodiment.

That is, according to the train wheel holding structure of the present disclosure, the combination such as the train wheel bridge as the first support member and the main plate as the second supporting member can be applied as long as the pointer hand wheel is supported with the first support member and the second support member by using the bush.

Accordingly, a configuration can be adopted in which two or more support holes supporting the shaft of the pointer hand wheel with little looseness are provided in the main plate corresponding to the second support member, and the bush is provided in any one of the support holes supporting the pointer hand wheel, so as to support the pointer hand wheel without looseness by the shaft hole of the bush and the shaft hole provided in the train wheel bridge corresponding to the first support member.

According to the train wheel holding structure of the present disclosure, the combination of one train wheel bridge as the first support member and the other train wheel bridge as the second support member can be applied, and supporting members different from the main plate and the train wheel bridge can be applied as the first support member and the second support member.

According to the train wheel holding structures 80, 80' of the present embodiment, the outer circumferential surfaces of the shafts 51a, 61a of the pointer hand wheels 51, 61 are supported in two positions in the axial direction with the main plate 78 and the train wheel bridge 70 by using the bush 75. However, the number of support portions is not limited to two.

According to the train wheel holding structures 80, 80' of the present embodiment, the outer circumferential surfaces of the shafts 51a, 61a of the pointer hand wheels 51, 61 may be supported; however, the leading ends of the shafts 51a, 61a may contact to be supported for either one (for example, train wheel bridge 70).

The train wheel bridge 70 of the above embodiment has the two support holes (support holes 71, 72) to which the bush 75 is selectively attached; however, the number of support holes may be three or more.

Note that the two or more support holes in the present disclosure may be one connected support hole. That is, the support hole may be one connected support hole as long as the support hole has in different positions the center portions supporting the pointer hand wheel, and the shaft holes are provided in two or more different positions by attaching the bush to each support hole even if the support holes are connected as one hole.

As one example, "two or more support holes" of the present disclosure includes a single hole having a contour of a gourd shape in which two support holes are connected (shape in which upper and lower two circular portions are connected in neck portion provided in center of "8" shape).

According to the train wheel holding structures 80, 80' of the above embodiment, the train wheel bridge 70 is a member made of a resin material; however, the material of the train wheel bridge 70 is not limited to resin, and the train wheel bridge 70 may be made of a metal material or a ceramic material, for example.

The train wheel holding structure 80 of the above embodiment is used for the timepiece 100 to which the rotation hand movement train wheel 50 is applied as a hand movement train wheel. The train wheel holding structure 80' is used for the timepiece 200 to which the fan-shaped/sector hand movement train wheel 60 is applied as a hand movement train wheel. However, according to the train wheel holding structure 80 and the train wheel holding structure 80', the hand movement modes of the hand movement train wheel may not differ between the rotation hand movement and the fan-shaped/sector hand movement as long as the train wheel holding structure 80 and the train wheel holding structure 80' are applied to timepieces in which centers of timepiece dials differ to each other (center C3 and center C4).

Accordingly, the train wheel holding structure 80 may hold the rotation hand movement train wheel driving the pointer hand wheel rotating about the center C3, and the train wheel holding structure 80' may hold the rotation hand movement train wheel driving the pointer hand wheel rotating about the center C4. On the other hand, the train wheel holding structure may hold the fan-shaped/sector hand movement train wheel driving the pointer hand wheel moving in a fan shape/sector about the center C3, and the train wheel holding structure 80' may hold the fan-shaped/sector hand movement train wheel driving the pointer hand wheel moving in a fan shape/sector about the center C4.

In the train wheel holding structure 80 of the above embodiment, the center C4 is positioned farther from the center C1 of the timepiece dials 20, 20' than the center C3.

However, the distances between the centers C3, C4 from the center C1 may not differ, i.e., may be the same, or the centers C3, C4 may differ in the angle positions about the center C1.

As illustrated in FIGS. 4, 6, it is preferable for the bush 75 to contact another member (e.g., rotation substrate 79) in the axial directions of the pointer hand wheels 51, 61 (direction toward train wheel bridge 70 from main plate 78).

As the train wheel holding structure 80 is configured as described above, even though the pressing force in the axial direction generated in the shafts 51a, 61a acts on the bush 75 when the pointer hands 52, 62 are attached to the shafts 51a, 61a of the pointer hand wheels 51, 61, the pressing force is dispersed by the entire contact surfaces of the bush 75 and another member (e.g., rotation substrate 79) to be received, so that the load resistance in the bush 75 can be improved.

The train wheel holding structure in which the bush 75 contacts another member in the axial direction is not limited to the structure including the two support holes (support hole 71 and support hole 72) to which one bush 75 is attached, as the train wheel bridge 70 of the above embodiment.

More specifically, the train wheel holding structure includes a first support member, a second support member, a pointer hand wheel including a pointer hand and a shaft, the pointer hand wheel being supported by the first support member and the second support member, and a train wheel driving the pointer hand wheel, wherein the first support member includes one or more shaft holes (one shaft hole or two or more shaft holes) supporting the shaft of the pointer hand wheel, and the second support member includes the support hole corresponding to one or more shaft holes of the first support member, a bush supporting the shaft of the pointer hand wheel without looseness is provided in the support hole corresponding to the shaft hole by which the pointer hand wheel is supported. In such a train wheel holding structure, the bush contacts another member (circuit substrate 79 or member other than that) in the axial direction.

With this configuration of the train wheel holding structure, even though the pressing force in the axial direction generated in the shaft acts on the bush when the pointer hand is attached, the pressing force is dispersed by the entire contact surfaces of the bush and another member (e.g., rotation substrate or member other than that) to be received, so that the load resistance in the bush can be improved.

It is preferable to provide an opening portion or a concave portion in a shaft hole 76 extended region at a position corresponding to the bush 75 of another member (e.g., circuit substrate 79) that the bush 75 contact. The opening portion or the concave portion has a size smaller than the external shape of the bush 75 and larger than the shaft hole 76 or a size equal to the shaft hole 76.

With this configuration, the shaft 51a can be prevented from interfering with another member (e.g., circuit substrate 79) even when the long shaft 51a of the pointer hand wheel 51 inserted into the shaft hole 76 is used while maintaining the contact surfaces of the bush 75 and another member (e.g., circuit substrate 79).

With the configuration in which the concave portion housing the entire or a part of the thickness of the bush 75 is provided in another member (e.g., circuit substrate 79) that the bush 75 contacts, the thickness of the train wheel holding structure 80 in the thickness direction of the bush 75 can be reduced.

When a high-speed rotating function hand such as a chronograph is used as the pointer hand wheel, it is desired to lower the torque required for rotating the pointer hand wheel as much as possible. Thus, it is desirable to have a small shaft hole supporting the pointer hand wheel. On the other hand, when a large (heavy) pointer hand attached to the pointer hand wheel is used, it is preferable to have a large shaft hole so as to stand for the large rotation torque of the pointer hand wheel.

Therefore, plural types of bushes provided with shaft holes having different sizes are prepared, and the bush provided with the shaft hole having a size corresponding to the pointer hand wheel to be used is selected, so as to be used for the support member (first support member, second support member) provided with the support hole having a fixed size regardless of the size of the shaft hole. Thus, the costs can be lowered smaller than that when the plural types of support members provided with the shaft holes having the different sizes are prepared.

The invention claimed is:

1. A train wheel holding structure comprising:
a first support member;
a second support member;
a pointer hand wheel including a pointer hand and a shaft, the pointer hand wheel being supported by the first support member and the second support member; and
a train wheel driving the pointer hand wheel, wherein
the first support member includes two or more shaft holes corresponding to different two or more positions to support the shaft of the pointer hand wheel, and
the second support member includes a support hole corresponding to each of the two or more shaft holes, a bush supporting the shaft of the pointer hand wheel without looseness is provided in the support hole corresponding to the shaft hole by which the pointer hand wheel is supported, and the bush is not provided in the support hole corresponding to the shaft hole by which the pointer hand wheel is not supported.

2. The train wheel holding structure according to claim 1, wherein the first support member is disposed between the pointer hand and the second support member.

3. The train wheel holding structure according to claim 1, wherein the bush is made of a material having a wear resistance higher than that of the second support member.

4. The train wheel holding structure according to claim 3, wherein the bush is made of a metal material, a semiprecious stone material, or a ceramic material as the material having a wear resistance higher than that of the second support member.

5. The train wheel holding structure according to claim 1, wherein the two or more support holes are disposed to correspond to positions different from each other in the timepiece dial.

6. The train wheel holding structure according to claim 5, wherein
one of the two or more support holes of the second support member is positioned relatively close to a rim of the timepiece dial, and another support hole different from the one support hole is positioned relatively far from the rim of the timepiece dial,
the one support hole corresponding to the position relatively close to the rim of the timepiece dial supports the pointer hand wheel moving in a fan shape/sector, and
the another support hole corresponding to the position relatively far from the rim of the timepiece dial supports the pointer hand wheel moving by rotating.

7. The train wheel holding structure according to claim 1, wherein the bush contacts another member in the axis direction.

8. The train wheel holding structure according to claim 7, wherein the another member is provided with an opening portion or a concave portion having a size smaller than an external shape of the bush and larger than a shaft hole provided in the bush or a size equal to the shaft hole.

9. A timepiece comprising:
the train wheel holding structure according to claim 1, and
the pointer hand wheel and the train wheel corresponding to the support hole in which the bush is provided.

* * * * *